United States Patent [19]

Hasegawa et al.

[11] 4,122,465
[45] Oct. 24, 1978

[54] DEVICE FOR INDICATING CONDITION OF EXPOSURE IN AN AUTOMATIC CONTROL TYPE ELECTRONIC FLASH UNIT FOR FLASH PHOTOGRAPHY

[75] Inventors: Hiroshi Hasegawa, Tokyo; Yoshiaki Ohtsubo, Kawasaki; Sakuji Watanabe, Yono, all of Japan; Kouichi Takahata, deceased, late of Tokyo, by Kosaku Takahata, legal successor

[73] Assignee: Nippon Kogaku K.K., Tokyo, Japan

[21] Appl. No.: 808,536

[22] Filed: Jun. 21, 1977

[30] Foreign Application Priority Data

Jun. 23, 1976 [JP] Japan .................................. 51-73101
Jun. 23, 1976 [JP] Japan .................................. 51-73102

[51] Int. Cl.² .......................................... G03B 15/05
[52] U.S. Cl. .................... 354/32; 354/60 L; 354/128
[58] Field of Search ............... 354/32, 33, 34, 60 E, 354/60 L, 128, 145, 127

[56] References Cited

U.S. PATENT DOCUMENTS

| | | | |
|---|---|---|---|
| 3,950,767 | 4/1976 | Matsui | 354/60 L X |
| 3,993,928 | 11/1976 | Wilwerding | 354/128 X |
| 4,051,491 | 9/1977 | Toyoda | 354/60 L |

Primary Examiner—Michael L. Gellner
Attorney, Agent, or Firm—Fitzpatrick, Cella, Harper & Scinto

[57] ABSTRACT

An automatic control type electronic flash unit includes flashlight generator, a metering device for measuring the quantity of light emitted from the flashlight generator and reflected by an object to be photographed, a first detector for detecting the output of the metering device and generating a proper output when the output corresponds to a quantity of light which provides a proper exposure, and apparatus for discontinuing the flashlight generation of the flashlight generator in response to the proper output, a second detector for generating an over-exposure output when the output of the metering device related to the quantity of the reflection, by the object, of the flashlight generated during the time from the generation of the proper output until the discontinuation of the flashlight generation of the flashlight generator reaches a predetermined value, and an indicator operable by an over-exposure output to indicate an over-exposure.

5 Claims, 6 Drawing Figures

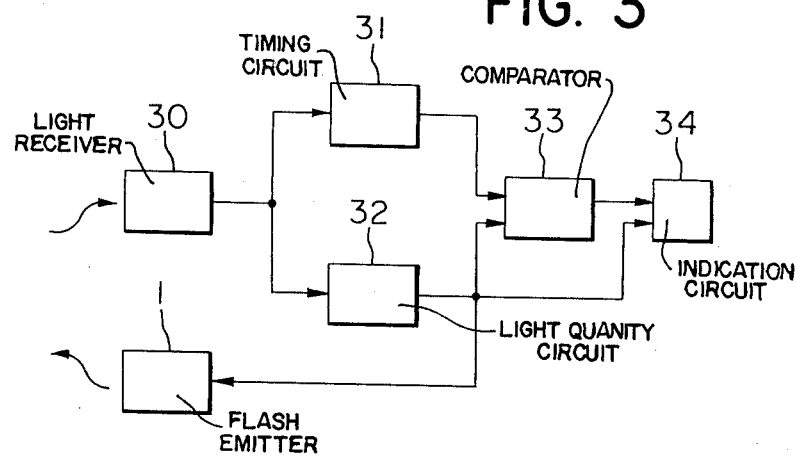
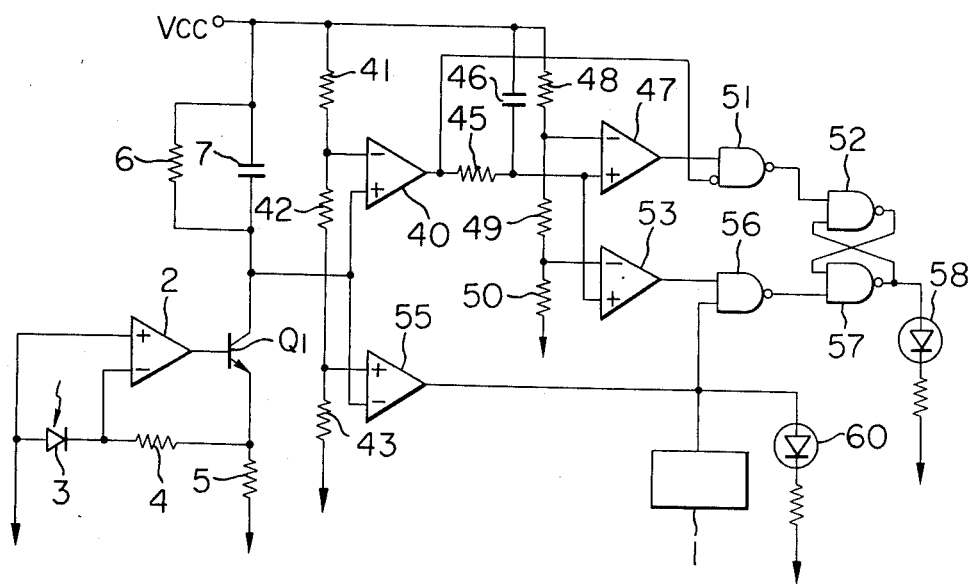

FIG. 5-I
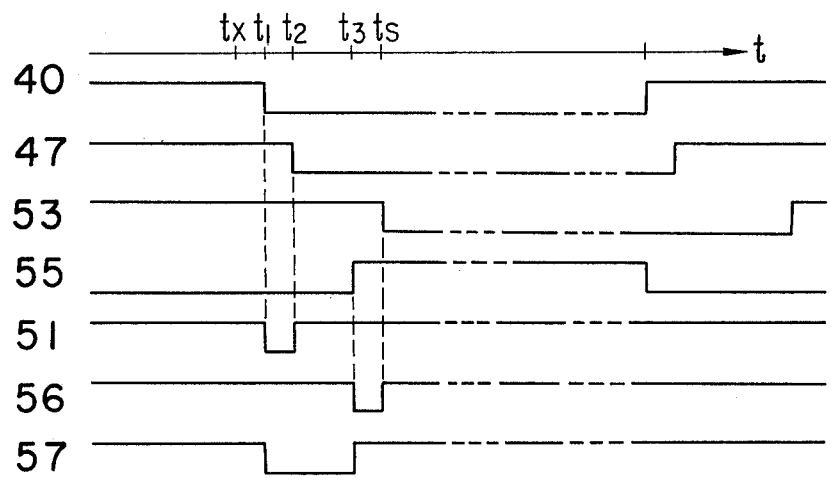
FIG. 5-II
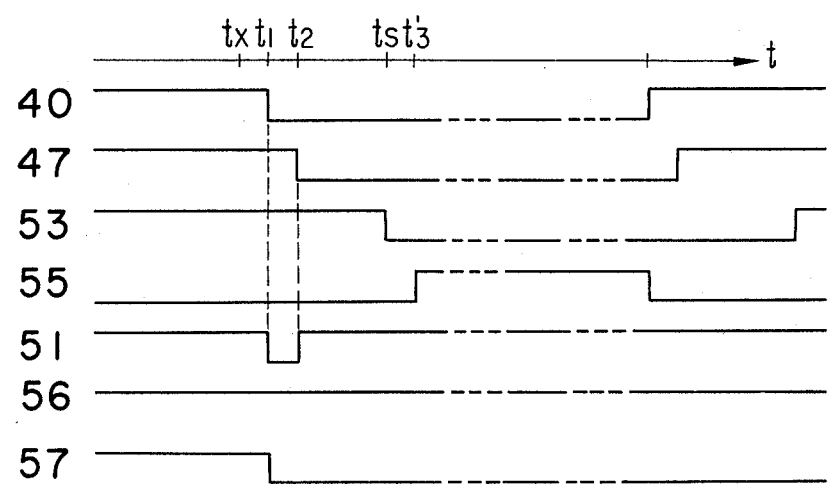

DEVICE FOR INDICATING CONDITION OF EXPOSURE IN AN AUTOMATIC CONTROL TYPE ELECTRONIC FLASH UNIT FOR FLASH PHOTOGRAPHY

BACKGROUND OF THE INVENTION

1. Field of the Invention

This invention relates to an automatic control type electronic flash unit for flash photography which is capable of automatically controlling the quantity of its emitted light, and more particularly, to a device for indicating whether the quantity of light emitted by the flash unit is proper.

2. Description of the Prior Art

In automatic control type electronic flash units the quantity of the flashlight reflected by an object to be photographed is measured by a metering circuit, and when such quantity of light has become sufficient to provide a proper exposure, the light emission of the flash lamp is discontinued by the output of the metering circuit. It has heretofore been proposed to cause an indicator device to be operated by the output of the above-mentioned metering circuit to indicate the emission of the quantity of flashlight sufficient for a proper exposure. However, a predetermined time delay exists from the generation of the output of the metering circuit until the actual discontinuation of the flashlight, and therefore, the flash lamp emits a predetermined quantity of excess flashlight during the predetermined time delay. Where the object to be photographed is distant from the camera and accordingly, a long flash time is necessary to provide a proper exposure, that is, where generation of a great quantity of flashlight is required, the aforementioned time delay is negligible as compared with that necessary long flash time, or to put it another way, the aforementioned quantity of excess light is negligible as compared with the necessary relatively great quantity of flashlight. However, where the object to be photographed lies near the camera so that a very short time of flash is required to provide a proper exposure, the aforementioned time delay is not negligible with respect to such short flash time and over-exposure will result from the abovementioned quantity of excess flashlight.

SUMMARY OF THE INVENTION

We have conceived and contribute by the present invention an indicator device in an automatic control type electronic flash unit which is capable of effecting the indication of the propriety or impropriety of exposure during flash photography of a nearby object.

According to the present invention, the automatic control type electronic flash unit includes flashlight generating means, metering means for measuring the quantity of light emitted from the flashlight generating means and reflected by an object to be photographed, first detector means for detecting the output of the metering means and generating a proper output when the output corresponds to a quantity of light which provides a proper exposure, and means for discontinuing the flashlight generation of the flashlight generating means in response to the proper output. A feature of the present invention resides in the further provision of second detector means for generating an over-exposure output when the output of the metering means relative to the quantity of the reflection, by the object, of the flashlight generated during the time from the generation of the proper output until the discontinuation of the flashlight generation of the flashlight generating means reaches a predetermined value, and indicating means operable by an over-exposure output to indicate an over-exposure.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject of the claims appended hereto. Those skilled in the art will appreciate that the conception upon which this disclosure is based may readily be utilized as a basis for the designing of other structures for carrying out the several purposes of the invention. It is important, therefore, that the claims be regarded as including such equivalent constructions as do not depart from the spirit and scope of the invention.

BRIEF DESCRIPTION OF THE DRAWINGS

Specific embodiments of the invention have been chosen for purposes of illustration and description, and are shown in the accompanying drawings, forming a part of the specification, wherein:

FIG. 3 is a block diagram of a third embodiment of the present invention;

FIG. 4 is a detailed circuit diagram of the third embodiment; and

FIG. 5 graphically illustrates the outputs of various circuit elements in FIG. 4.

DESCRIPTION OF THE PREFERRED EMBODIMENTS

Figure 1:
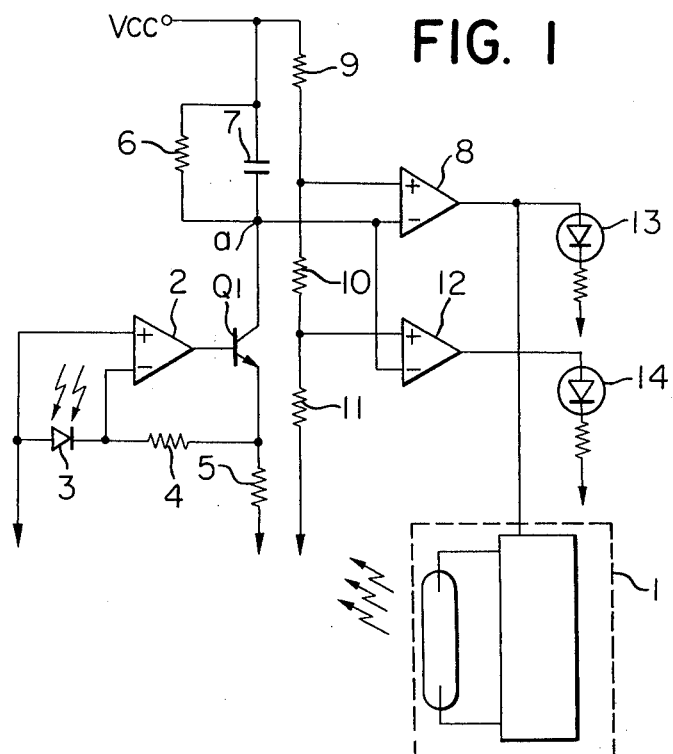
FIGS. 1 and 2 are circuit diagrams of first and second embodiments of the present invention.

Referring to FIG. 1 which shows the circuit according to a first embodiment of the present invention, the reflected light from an object illuminated by the flashlight from the light emitting portion 1 of a flash unit as the result of closing of a synchro-switch of a camera, not shown, may be received by a photodiode 3 connected to an operational amplifier 2. The photodiode 3 may generate a current proportional to the intensity of the light entering thereinto, and this current may be amplified by the action of the operational amplifier 2, resistors 4, 5 and transistor Q1. Accordingly, the collector current of the transistor Q1 is, at a value, related to the intensity of the light entering the photodiode 3.

A resistor 6 and an integrating capacitor 7 together constitute an integrating circuit. The integrating capacitor 7 may be charged with the above-described current related to the intensity of the entering light.

An operational amplifier 8 acting as a comparator has its inversion input terminal connected to the junction a between the integrating capacitor 7 and the collector of the transistor Q1, and has its non-inversion input terminal connected to the junction between resistors 9 and 10. The comparator 8 may generate an output when the charging voltage of the integrating capacitor 7, i.e. the integration value of the light received by the photodiode 3 which receives the reflected light from the object, has reached a proper value for providing a proper exposure determined by film sensitivity and other exposure factors. This output may discontinue the light emission of the light emitting portion 1. An operational amplifier 12 also acting as a comparator has its inversion input terminal connected to the junction a and has its non-inversion input terminal connected to the junction between resistors 11 and 10. This comparator 12 is provided to detect the aforementioned quantity of excess light generated by the light emitting portion 1 during the time interval from the reception of the output from the comparator 8 until the discontinuation of the light emission, and it may generate an output representative of over-exposure when the integrating capacitor 7 is charged excessively by a predetermined value beyond the proper value.

More specifically, the excess quantity of light corresponding to the predetermined value is added to the proper quantity of light so far emitted, thus providing a condition of substantial over-exposure. That excess quantity of light, if it has not reached the predetermined value, can be neglected and provide a proper exposure.

Light-emitting diodes 13 and 14 may be driven by the outputs of the comparators 8 and 12, respectively.

Operation will now be described. When the synchro-switch of the camera is closed, the light emitting portion 1 of the flash unit emits flashlight which illuminates the object. The reflected light from the object is received by the photodiode 3. The received light is integrated by the integrating capacitor 7 and, when the charging voltage of this capacitor reaches a proper value, the output level of the comparator 8 is inverted from low (L) level to high (H) level to generate an output. This turns on the light emitting diode 13. At the same time, the output of the comparator 8 discontinues the light emission of the light emitting portion 1 of the flash unit. The light emitting portion 1 continues to emit flashlight during delay time following the application of the output from the comparator 8. The reflected light from the object within the delay time is further received by the photodiode 3, and then integrated by the integrating capacitor 7. If the increment of the charging voltage of the integrating capacitor 7 does not reach the aforementioned predetermined value, the comparator 12 remains at L-level, thus generating no output. Accordingly, the light emitting diode 14 remains turned off. The turn-on of the light emitting diode 13 and the turn-off of the light emitting diode 14 indicates that the exposure has been proper.

However, when the object lies near the camera and much of the reflection of the aforementioned excess light from the object reaches the photodiode 3, the charging voltage of the integrating capacitor 7 rises excessively by a predetermined value greater than the proper value, so that the output level of the comparator 12 is inverted from L-level to H-level, thus generating an output. This turns on the light emitting diode 14 and with the light emitting diode 13 already turned on, it indicates an improper exposure or over-exposure.

In the first embodiment now under discussion, the time during which the proper exposure and over-exposure are indicated is very short, that is, the indication of these comes to an end immediately after the discontinuation of the light emission. Such a disadvantage may be overcome by a second embodiment of the present invention as shown in FIG. 2 wherein elements functionally similar to those in FIG. 1 are given similar reference characters and need not be described.

Figure 2:
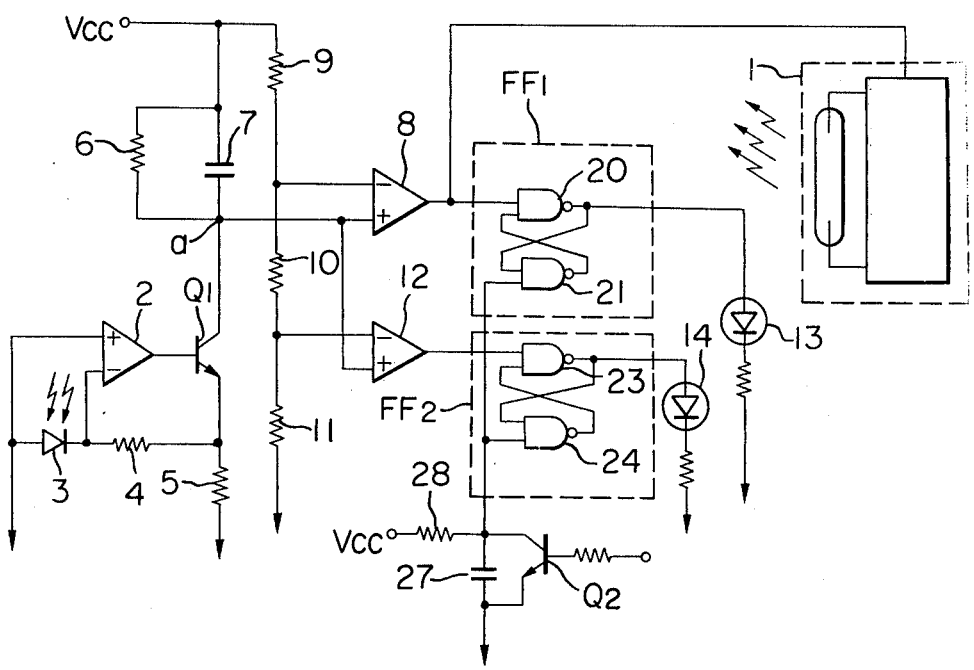

As shown in FIG. 2, as the outputs of the comparators 8 and 12 are temporarily stored in a first flip-flop circuit FF1 comprising NAND gate circuits 20 and 21 and in a second flip-flop circuit FF2 comprising NAND gate circuits 23 and 24 and the indication by the light emitting diodes 13 and 14 may be continued for a predetermined time. In the present embodiment, the connections between the input terminals of the operational amplifiers 8, 12 and the integrating capacitor 7 and the voltage dividers 9, 10, 11 are opposite to those in the first embodiment.

Assuming that power begins to be supplied from a power supply terminal Vcc, a capacitor 27 starts to be charged through a resistor 28 so that the terminal voltage of this capacitor begins to rise. Therefore, the inputs of the NAND gate circuits 21 and 24 of the flip-flop circuits FF1 and FF2 vary from L-level to H-level. Next, when the synchro-switch of the camera is closed to effect light emission of the light emitting portion 1, a transistor Q2 conducts to short-circuit the capacitor 27, which thus discharges. The inputs of the NAND gate circuits 21 and 24 each assume L-level and the outputs of the flip-flop circuits FF1 and FF2 each assume L-level, whereby they are set. The conduction time of the transistor Q2 is set such that the inputs of the NAND gates 21 and 24 each restore H-level before the synchro-switch of the camera is closed. This ensures that the flip-flops FF1 and FF2 can be set each time the synchro-switch is closed. In this manner, malfunctioning which would otherwise result from noise or the like may be prevented. The reflection light from the object illuminated by the flashlight from the light emitting portion 1 is received by the photodiode 3, so that the capacitor 7 starts to be charged. When the charging voltage of the capacitor 7 reaches its proper value, the output of the comparator 8 is inverted from H-level to L-level and the output of the flip-flop circuit FF1 becomes H-level to turn on the light emitting diode 13, which thus indicates a proper exposure. After the lapse of the aforementioned delay time, the light emission of the light emitting portion 1 is discontinued by the aforementioned output of the comparator 8.

However, when the quantity of light emitted during the aforementioned delay time of the light emitting portion 1 has charged the capacitor 7 to a charging voltage excessive by a predetermined value beyond the proper value, the output of the comparator 12 is inverted from H-level to L-level, so that the output of the flip-flop circuit FF2 is inverted from L-level to H-level. Accordingly, the light emitting diode 14 is also turned on to indicate over-exposure. The turn-on of each light emitting diode is maintained until the next closing of the synchro-switch.

If the object is very distant from the camera and the quantity of reflection therefrom entering the photodiode 3 is so small that the charging voltage of the capacitor 7 does not reach its proper voltage level, then the outputs of the comparators 8 and 12 are not inverted but remain at H-level. Accordingly, the outputs of the flip-flops FF1 and FF2 remain at L-level and the light emitting diodes 13 and 14 are not turned on, thus indicating under-exposure.

In the above-described two embodiments, the excess quantity of light is directly measured, and when it is greater than a predetermined value, over-exposure is determined. Determination of whether the excess quantity of light substantially affects the exposure condition may be accomplished not only by the direct measurement of the excess quantity of light by the metering circuit as described above, but also by measuring the time immediately following the emission of the flashlight until the detection of the proper quantity of light by the metering circuit. Describing the latter in detail, whenever the excess quantity of light causes over-exposure, the time from the emission of flashlight until the detection of the proper quantity of light by the metering circuit is short and therefore, by predetermining the above-described critical time for which the excess quantity of light causes over-exposure and by comparing the actual time for which a proper exposure has occurred with the predetermined critical time, it is possible to determine proper exposure when the former time is longer, and to determine over-exposure when the former time is shorter. Description will hereinafter be made of a third embodiment in which propriety of impropriety of exposure is determined from the time detected for a proper quantity of light.

A block diagram of the third embodiment is shown in FIG. 3. The flashlight emitted from the light emitting portion 1 is reflected by the object and enters a light receiving portion 30. A circuit 31 for preparing the above-described predetermined time measures the time from the start of light reception by the light receiving portion 30 and generates an output after lapse of the predetermined time. A circuit 32 for measuring the quantity of light generates an output when the proper quantity of light providing a proper exposure is reached, thus discontinuing the light emission of the light emitting portion 1. A comparator circuit 33 compares the time of generation of the output of the predetermined time preparing circuit 31 and the time of generation of the output of the quantity-of-light measuring circuit 32 and if the latter time is earlier, the comparator circuit 33 generates an output representing over-exposure. An indication circuit 34 indicates over-exposure with the aid of the output of the comparator circuit 33, indicates a proper exposure when the output of the comparator circuit is null with the output of the quantity-of-light measuring circuit being present, and indicates under-exposure when both outputs are null.

A specific example of the circuit shown in the block diagram is diagrammatically illustrated in FIG. 4. The operational amplifier 2, photodiode 3, resistors 4, 5 and 6, capacitor 7 and transistor Q1 are identical to those in the previously described embodiments.

A comparator 40 is biased by resistors 41, 42 and 43 so that it generates an L-level output as soon as the capacitor 7 is charged. A resistor 45 and a capacitor 46 together constitute an integrating circuit, and the capacitor 46 starts to be charged when the comparator 40 generate L-level output. A comparator 47 is biased by resistors 48, 49 and 50 so that it generates L-level output as soon as the capacitor 46 is charged. A difference is provided between the point of time whereat the comparator 40 generates its output and the point of time whereat the comparator 47 generates its output. The outputs of the comparators 40 and 47 are applied to a NAND gate circuit 51, the output of which is applied to a NAND gate circuit 52. A comparator 53 is biased by resistors 48, 49 and 50 so that it generates a timer signal at its output terminal when the charging voltage of the capacitor 46 reaches a predetermined level in the aforementioned predetermined time after the start of the charging.

A comparator 55 generates a proper signal when the capacitor 7 is charged up to a proper voltage level corresponding to a proper quantity of light, that is, when the quantity of light entering the photodiode 3 reaches a proper level for providing a proper exposure.

A NAND gate circuit 56 receives as input the timer signal and the proper signal from the comparators 53 and 55, respectively. NAND gate circuits 52 and 57 together constitute a flip-flop circuit FF3 and receive as input the outputs from the NAND gate circuits 51 and 56.

A light emitting diode 58 driven by the output of the NAND gate circuit 57 is an indication element. Designated by Vcc is a power supply terminal, and E a ground or earth terminal.

Operation will hereinafter be deacribed by reference to the time charts of FIGS. 5-I and 5-II.

When the synchro-contact of the camera is closed at a point of time $t_x$, the light emitting portion 1 emits flashlight which illuminates the object to be photographed. The reflected light from the object enters the photodiode 3 and, as soon as the capacitor 7 starts to be charged, the output condition of the comparator 40 is inverted from H-level to L-level at a point of time $t_1$. At the same time, the output condition of the NAND gate circuit 51 is inverted from H-level to L-level since the output of the comparator 47 is at H-level. When the output of the comparator 40 becomes L-level, the capacitor 46 starts to be charged and immediately at a point of time $t_2$, the output of the comparator 47 is inverted from H-level to L-level. When the output of the comparator 47 assumes L-level, the output of the NAND gate circuit 51 becomes H-level. The output generated by the NAND gate circuit 51 between the points of time $t_1$ and $t_2$ provides a set signal for the flip-flop circuit FF3, which renders the output of the NAND gate 57 L-level irrespective of the history thereof.

When the capacitor 46 is charged and attains a predetermined voltage at a point of time $t_s$, the output of the comparator 53 is inverted from H-level to L-level. This provides the timer signal and the time from the point of time $t_x$ until the point of time $t_s$ is the aforementioned predetermined time.

On the other hand, when the capacitor 7 is charged to a proper voltage, the output of the comparator 55 is inverted from L-level to H-level. This provides the proper signal, which is applied to the NAND gate 56 and turns on the light emitting diode 60 while turning off the light emitting portion 1.

The NAND gate circuit 56 discriminates as to whether the point of time at which the output of the comparator 55 becomes H-level is earlier or later than the point of time at which the output of the comparator 53 becomes L-level, namely, the point of time $t_s$ at which the timer signal is generated. When the output of the comparator 55 becomes H-level at a point of time $t_3$ earlier than the point of time $t_s$, as shown in FIG. 5-I, the output of the NAND gate circuit 56 becomes L-level from $t_3$ until $t_s$, thereby inverting the output of the flip-flop circuit FF3 to H-level. When the output of the comparator 55 becomes H-level at a point of time $t_3$ later than $t_3$, as shown in FIG. 5-II, the output of the NAND gate circuit 56 is not varied but remains at H-level and the output of the flip-flop circuit FF3 remains at L-level. That is, when the quantity of light emitted from the light emitting portion 1 reaches a proper level at the point of time $t_3$, earlier than the shortest light emission time at which the excess quantity of light produced during the aforementioned delay time no longer adversely affects the film exposure, namely, the predetermined time $t_s$, the output of the flip-flop circuit FF3 is inverted to H-level to turn on the light emitting diode 58, and when the quantity of light emitted from the light emitting portion 1 reaches a proper level after the point of time $t_3$, the output of the flip-flop circuit FF3 remains at L-level and the light emitting diode 58 remains turned off.

Thus, the turn-on of the light emitting diode 60 and the turn-off of the light emitting diode 58 indicates proper exposure, the turn-on of the two light emitting diodes 60 and 58 indicates the over-exposure resulting from the aforementioned excess light, and the turn-off of the two light emitting diodes 60 and 58 indicates the under-exposure.

In the present embodiment, the predetermined time is prepared by the charging of the capacitor 46 during the time from the point $t_1$ until the point $t_2$, but of course it may also be prepared by starting the charging of the capacitor in response to the closing of the synchroswitch.

We believe that the construction and operation of our novel device will now be understood and that the advantages thereof will be fully appreciated by those persons skilled in the art.

We claim:

1. In an automatic control type electronic flash unit including:
    (a) flashlight generating means;
    (b) metering means for measuring the quantity of light emitted from said flashlight generating means and reflected by an object to be photographed;
    (c) first detector means for detecting the output of said metering means and generating a proper output when said output corresponds to a quantity of light which provides a proper exposure; and
    (d) means for discontinuing the flashlight generation of said flashlight generating means in response to said proper output; the improvement comprising:
    (e) second detector means for generating an overexposure signal as its output when the output of said metering means related to the quantity of the reflection, by said object, of the flashlight generated during the time from the generation of said proper output until the discontinuation of the flashlight generation of said flashlight generating means reaches a predetermined value; and
    (f) indicating means operable by the over-exposure signal to indicate an over-exposure.

2. An automatic control type electronic flash unit according to claim 1, wherein the improvement further comprises a holding circuit for holding the output of said second detector means.

3. An automatic control type electronic flash unit according to claim 1, wherein said second detector means includes a comparator circuit for comparing the output of said metering means with a reference voltage and for generating an output serving as said over-exposure signal when the output of said metering means exceeds said reference value.

4. An automatic control type electronic flash unit according to claim 1, wherein said second detector means includes:
    (g) a predetermined time preparing circuit for generating an output in a predetermined time after the flashlight generation of said flashlight generating means; and
    (h) a comparator circuit for comparing the time at which the proper output of said first detector means is generated with the time at which the output of said predetermined time preparing circuit is generated and for generating an output serving as said over-exposure output when the former time is earlier than the latter time.

5. An automatic control type electronic flash unit according to claim 4, wherein said predetermined time preparing circuit is connected to said metering circuit, and starts to prepare said predetermined time when said metering circuit receives said reflection of said flashlight.

UNITED STATES PATENT AND TRADEMARK OFFICE
CERTIFICATE OF CORRECTION

PATENT NO. : 4,122,465
DATED : October 24, 1978
INVENTOR(S) : HIROSHI HASEGAWA, ET AL It is certified that error appears in the above-identified patent and that said Letters Patent are hereby corrected as shown below:

Column 6, line 9, change "deacribed" to --described--;

Column 6, line 56, change "$t_3$" to --$t_s$--.

Signed and Sealed this

Twenty-first Day of August 1979

[SEAL]

Attest:

LUTRELLE F. PARKER

Attesting Officer     Acting Commissioner of Patents and Trademarks